US012760878B2

(12) United States Patent
Cao et al.

(10) Patent No.: US 12,760,878 B2
(45) Date of Patent: Oct. 13, 2026

(54) DEFORMABLE LIGHTING APPARATUS

(71) Applicant: CURRENT LIGHTING SOLUTIONS, LLC, Beachwood, OH (US)

(72) Inventors: Jinlin Cao, Xian (CN); Junxian Chu, Xian (CN); Qi Yan, Xian (CN); Qiang Zou, Xian (CN)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

(21) Appl. No.: 19/272,051

(22) Filed: Jul. 17, 2025

(65) Prior Publication Data

US 2026/0251291 A1 Aug. 27, 2026

Related U.S. Application Data

(60) Provisional application No. 63/762,308, filed on Feb. 24, 2025.

(51) Int. Cl.

| | |
|---|---|
| ***F21V 21/30*** | (2006.01) |
| ***F21V 15/015*** | (2006.01) |
| ***F21V 23/00*** | (2015.01) |
| ***F21V 23/04*** | (2006.01) |
| ***F21V 23/06*** | (2006.01) |
| ***H05B 45/20*** | (2020.01) |

(Continued)

(52) U.S. Cl.

CPC ............ *F21V 21/30* (2013.01); *F21V 15/015* (2013.01); *F21V 23/002* (2013.01); *F21V 23/04* (2013.01); *F21V 23/06* (2013.01); *H05B 45/20* (2020.01); *F21Y 2103/10* (2016.08); *F21Y 2115/10* (2016.08)

(58) Field of Classification Search

CPC .............. F21Y 2103/10; F21Y 2115/10; F21Y 2103/00; F21Y 2103/37; F21V 21/30; F21V 15/015; F21V 23/06; F21V 7/005; F21V 17/107; F21V 21/005; F21V 21/26; H01R 33/0845; H01R 33/0818; H01R 33/0836; H01R 33/0854; H01R 33/0872; H01R 33/0863; H01R 33/0881; H01R 33/0809; H01R 33/08; F21S 4/28

See application file for complete search history.

(56) References Cited

U.S. PATENT DOCUMENTS 6,102,550 A * 8/2000 Edwards, Jr. ........... F21V 23/02 362/217.05

8,956,013 B1 * 2/2015 Shew .................... F21V 23/023 362/183

(Continued)

FOREIGN PATENT DOCUMENTS

CN 204986643 U 1/2016

CN 214468422 U 10/2021

(Continued)

OTHER PUBLICATIONS

International Search Report and Written Opinion dated May 26, 2026 which was issued in connection with PCT Application No. PCT/US/2026/014998.

*Primary Examiner* — Omar Rojas Cadima

(74) *Attorney, Agent, or Firm* — Buckley, Maschoff & Talwalkar LLC

(57) ABSTRACT

Pursuant to some embodiments, a deformable lighting device is provided.

16 Claims, 5 Drawing Sheets

(51) Int. Cl.

| | |
|---|---|
| *F21Y 103/10* | (2016.01) |
| *F21Y 115/10* | (2016.01) |

(56) References Cited

U.S. PATENT DOCUMENTS

| | | | | |
|---|---|---|---|---|
| 9,651,225 | B2 | 5/2017 | Purdy | |
| D841,227 | S | 2/2019 | Wang et al. | |
| 10,458,633 | B1 | 10/2019 | Mai | |
| 11,242,959 | B2 | 2/2022 | Lu et al. | |
| 2018/0087755 | A1 * | 3/2018 | Yorio | F21V 17/007 |
| 2020/0278106 | A1 | 9/2020 | Chen et al. | |

FOREIGN PATENT DOCUMENTS

| | | | |
|---|---|---|---|
| CN | 217004223 | U | 7/2022 |
| CN | 217217511 | U | 8/2022 |
| CN | 217928373 | U | 11/2022 |

* cited by examiner

DEFORMABLE LIGHTING APPARATUS

RELATED APPLICATIONS

This application is a U.S. utility application claiming benefit of and priority to U.S. provisional application Ser. No. 63/762,308 filed on Feb. 24, 2025, the contents of which are hereby incorporated by reference in their entirety for all purposes.

FIELD

The present disclosure relates to lighting devices.

BACKGROUND

A number of lighting applications commonly use fluorescent lighting tubes. The tubes are mounted within a luminaire that provides power to the tube. Increasingly, these fluorescent lighting tubes are being replaced with tubular LED light emitting devices. These LED lighting devices provide excellent illumination and last far longer than standard fluorescent tubes. These LED lighting devices also use less energy than fluorescent tubes. The luminaires that accommodate these tubes have different sizes. For example, a U6 compatible luminaire accommodates either a U-shaped tube that with legs positioned approximately six (6) inches apart or two tubes that are positioned parallel to each other six (6) inches apart. As another example, a U1 compatible luminaire accommodates either a U-shaped tube with legs positioned approximately one and five-eighths (1⅝) inches apart or two tubes that are positioned parallel to each other approximately one and five-eighths (1⅝) inches apart. As another example, a U3 compatible luminaire accommodates either a U-shaped tube with legs positioned approximately three (3) inches apart or two tubes that are positioned parallel to each other three (3) inches apart.

It is expensive and inefficient to stock and manufacture lighting devices that only fit in one size or type of luminaire. It would be desirable to provide an improved lighting apparatus that can be configured to fit in multiple types and sizes of luminaires.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1A:
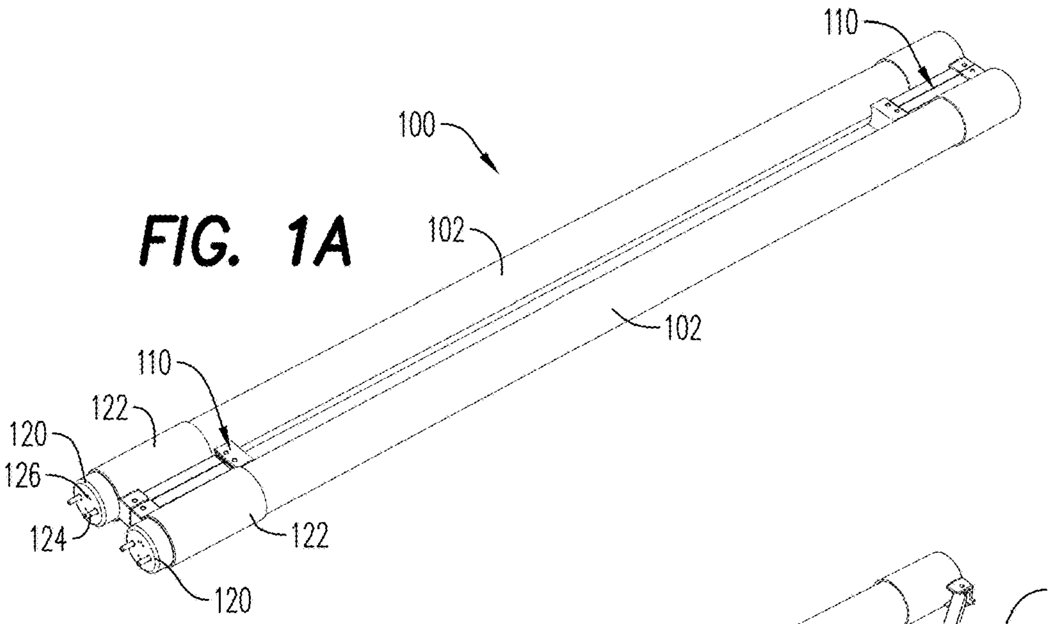
FIGS. 1A, 1B, and 1C are views of a deformable lighting device pursuant to some embodiments.
Figure 1B:
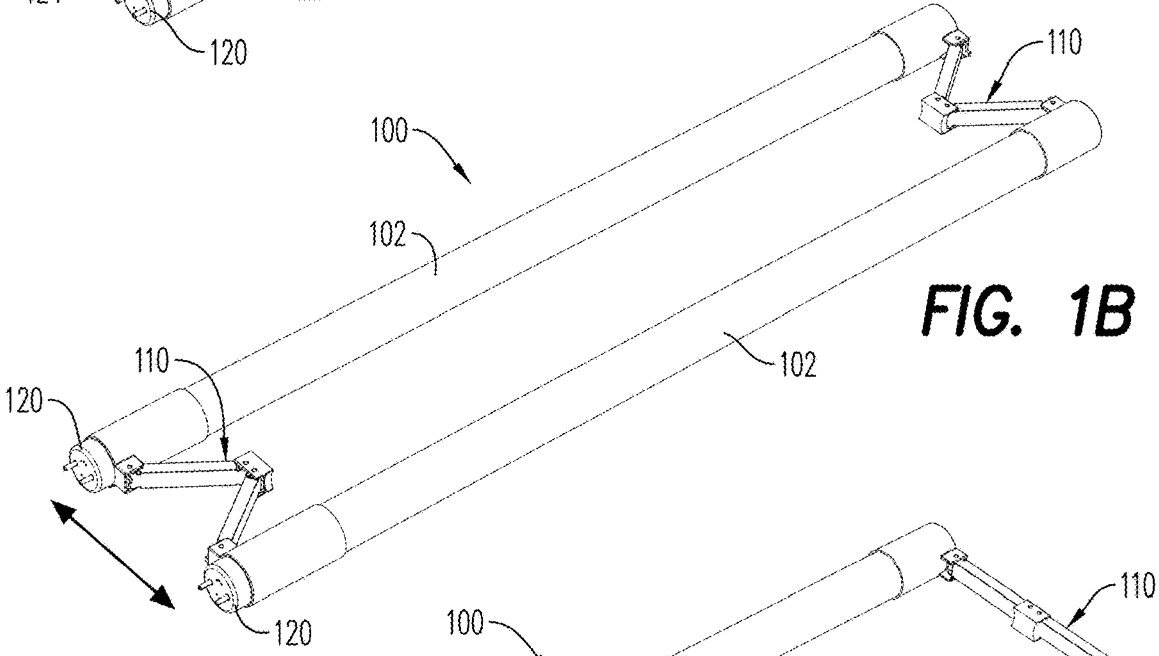
Figure 1C:
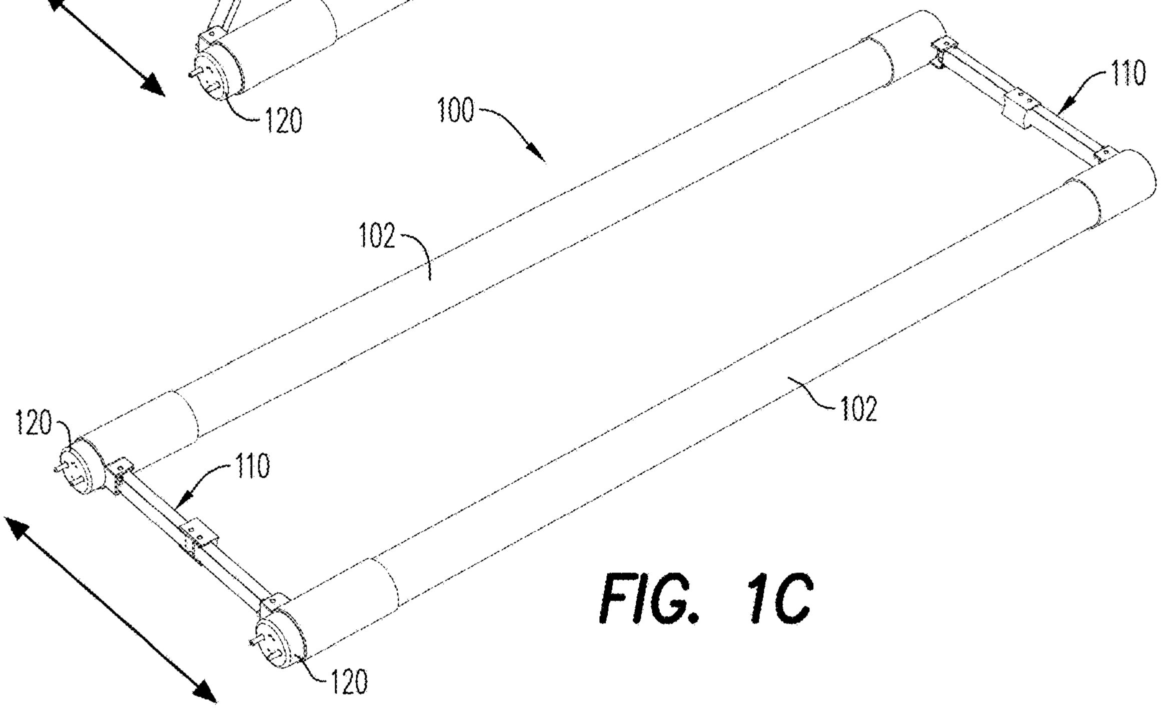

FIGS. 1A-1C illustrate a deformable lighting device 100 pursuant to some embodiments. FIG. 1A depicts the deformable lighting device 100 in a first configuration which allows the deformable lighting device 100 to be installed in a U1 compatible luminaire. In the configuration of FIG. 1A, two LED tubes 102 are positioned approximately 1⅝" from each other. The configuration of FIG. 1A is also convenient for shipping and packaging of the deformable lighting device 100. FIG. 1B depicts the deformable lighting device 100 in a partially expanded configuration (where the arrow shows the directions of expansion or retraction). FIG. 1C depicts the deformable lighting device 100 in a fully expanded configuration which allows the deformable lighting device 100 to be installed in a luminaire designed to accommodate LED tubes positioned further apart (e.g., such as a U6 type luminaire).

In the embodiment shown in FIG. 1, each deformable lighting device 100 includes two LED tubes 102 positioned generally in parallel with each other. Each LED tube 102 terminates with an end cap 120 that includes a pair of conductive pins 124 which are positioned to mate with an electrical socket in a light fixture in which the deformable lighting device 100 is to be installed. The conductive pins 124, once inserted into a light fixture will form an electrical connection providing power to the deformable lighting device. As shown in FIG. 1, the end cap 120 may be formed with a plurality of vent holes 126 which allow heat dissipation from the operation of the deformable lighting device 100.

As shown in FIG. 1, pursuant to the present invention, the deformable lighting device 100 includes two deformable frames 110 that are attached to insulating sleeves 122 mounted on each end of each of the LED tubes 102. Further details of the deformable frames 110 will be provided in conjunction with a description of FIGS. 2 and 3 below. In general, however, the deformable frames 110 allow the two LED tubes 102 to be positioned in different configurations (such as a first, retracted position shown in FIG. 1A and a second expanded position shown in FIG. 1C). The LED tubes 102 are moved between these positions by expanding (or contracting) the deformable frames 110 as shown by the arrow of FIG. 1B. This allows the deformable lighting device 100 to be used in luminaires configured to operate lamps of different sizes, thereby reducing the amount of inventory an installer requires and allowing greater flexibility in installation. For example, a 2'×2' troffer may be commonly configured for two (2) U6 lamps or three (3) U1 lamps. Embodiments allow an installer to modify the configuration of deformable lighting device 100 to achieve a desired configuration (e.g., by placing the deformable lighting device 100 in a U6 configuration to reduce the number of lamps required in a troffer, etc.). Further, by placing the deformable lighting device 100 in the deformed orientation (as shown in FIG. 1A), shipping and handling of the deformable lighting device 100 is improved (e.g., the deformed lighting device 100 may be shipped in a smaller package and is less susceptible to breakage or damage). The deformable frame 110 ensures that the two LED tubes 102 are maintained in a substantially parallel orientation no matter which configuration is used.

Figure 2:
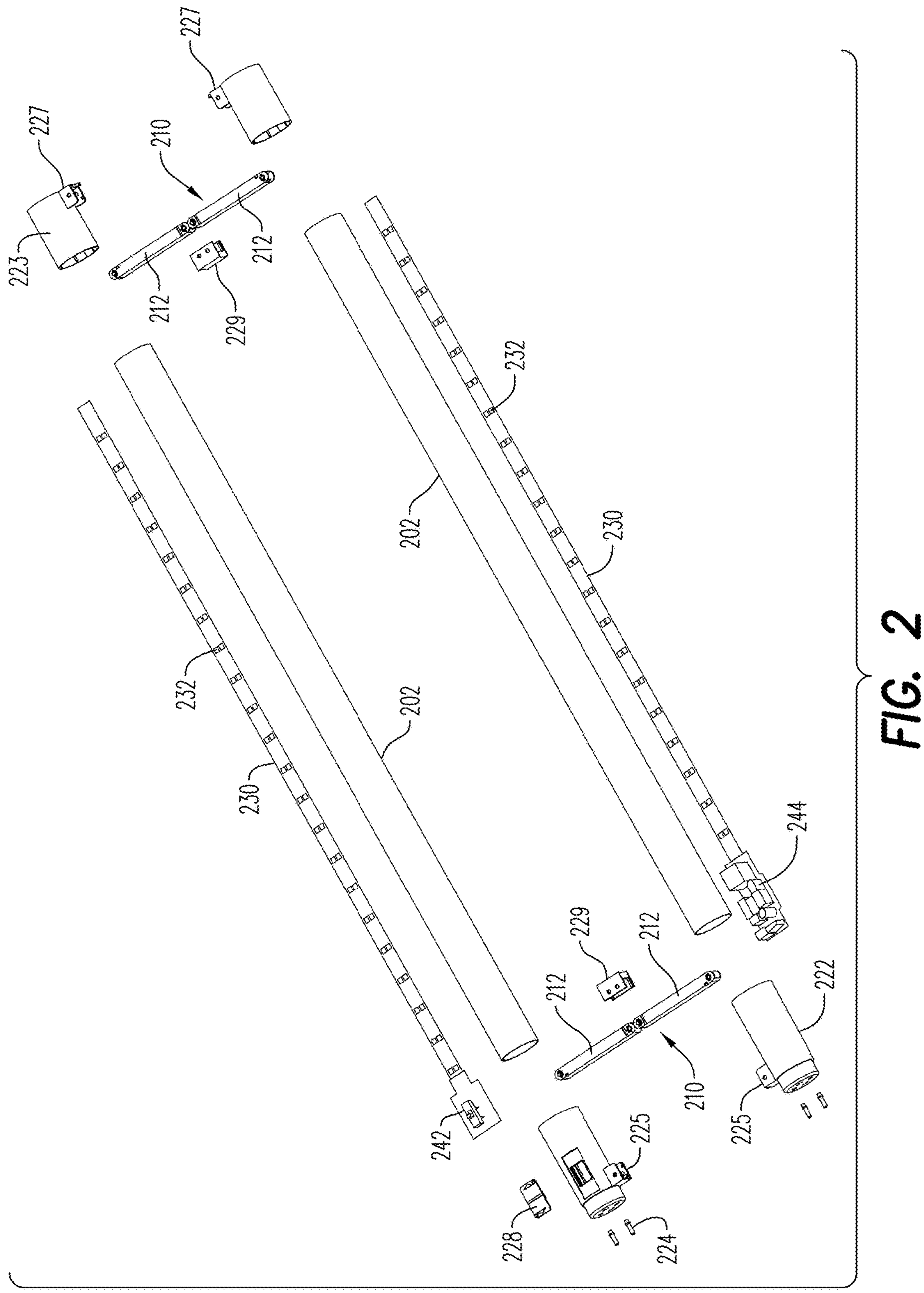
FIG. 2 illustrates an exploded view of a deformable lighting device pursuant to some embodiments.

Reference is now made to FIG. 2 where an exploded view of a deformable lighting device 200 pursuant to some embodiments is shown. As depicted in FIG. 2, the deformable lighting device 200 includes a number of components, including elongated LED tubes 202 into which are mounted LED light bars 230 having a plurality of LED light sources 232 mounted thereon. The LED light bars 230 are electrically connected to an external power source (not shown) through conductive pins 224. Each of the LED tubes 202 terminate at one end at a pin-endcap 222 and at the other end by an endcap 223. Each of the pin-endcaps 222 and endcaps 223 have insulating sleeves that fit around an outside of the elongated LED tubes 202. The pin-endcaps 222 have mounts 225 formed on them allowing a hinged connection with a deformable frame 210. The deformable frame 210 includes two legs 212 hingedly attached by a connector 229. The connector 229, in some embodiments, is generally placed in the middle of the deformable frame 210 (e.g. such that the length of the two legs 212 are approximately equal). The length of each leg is determined based on the desired configuration of the deformable lighting device and will be described further below in conjunction with FIG. 4. In some embodiments, each leg 212 is formed to permit cables or wiring to pass through the leg 212. For example, in some embodiments, each leg 212 is formed with a substantially rectangular or square cross section. In some embodiments, each leg 212 is formed with a substantially circular or oval cross section.

The endcaps 223 have mounts 227 formed on them allowing a hinged connection with a second deformable frame 210. The second deformable frame 210 includes two legs 212 hingedly attached by a connector 229. In some embodiments, the mounts 225, 227 are integrally formed as a part of the pin-endcaps 222 and endcaps 223 respectively. In some embodiments, the mounts 225, 227 are formed as separate components and are secured to the pin-endcaps 222 and endcaps 223 respectively.

In the embodiment of FIG. 2 one pin-endcap 222 is formed with a switch aperture 246 which allows a switch 228 to be held in the pin-endcap 222 and to extend through the surface of the pin-endcap 222 to connect with and operate a switch (not shown) mounted on a first driver 242 mounted within the pin-endcap 222. The switch 228 may be used to select between different correlated color temperature ("CCT") modes of operation of the deformable lighting device 200. For example, in some embodiments, the switch 228 may allow selection between 3000K, 3500K, 4000K and 5000K CCT output modes to allow a user or installer to select a desired color temperature level of output of the LED light sources 232. Further, because the lighting device 200 is deformable and expandable, the deformable lighting device 200 may be used in many different installation environments to satisfy different lighting needs with different color temperatures. One deformable lighting device 200 can replace many different variations of lighting devices accommodating a variety of installations.

Each LED light bar 230 is electrically connected at one end to a power source through the conductive pins 224. In the embodiment shown in FIG. 2, one of the LED light bars 230 is connected to a first driver 242 (which includes a switch operated by the switch 228). The first driver 242 may include a rectifier (to convert input AC received from an external power source) and a CCT selectable circuit, allowing the selective changing of the color temperature output by the LED light sources 232. The first driver 242 may also include a switch that is in mechanical (or electrical) communication with switch 228 to change the CCT mode of operation. The first driver 242 may include other components to prevent leakage and to meet FCC EMI requirements.

In the embodiment shown in FIG. 2, a second driver 244 is electrically connected at an end of a second LED light bar 230 and contained within a pin-endcap 222. The second driver 244 may include a main buck circuit to regulate and supply a constant current or a constant voltage appropriate for driving the LED sources 232. The two LED light bars 230 are in electrical communication through wiring (not shown) that passes through a deformable frame 210 at an end of the LED light bars 230 opposite the drivers 242, 244. The wiring, in some embodiments, passes through the endcaps 223 at the mounts 227 and is routed from one LED light bar 230 to the next via the deformable frame 210. Another deformable frame 210 is positioned at the other end of the LED light bars 230 near the drivers 242, 244. The deformable frame 210 hingedly connects to the pin-endcaps 222 at the mounts 225. Each of the deformable frames 210 are hingedly attached to insulating sleeves 222 that are mounted on each end of the LED tubes 202 such that when the LED tubes 202 are pushed toward each other (or pulled away from each other) the deformable frames 210 pivot at a connector 229 which allows the deformable frames 210 to collapse or extend (as will be described in further detail in FIG. 4). The result is a highly flexible lighting device that can be mounted in luminaires configured to operate lamps of different sizes.

Figure 3B:
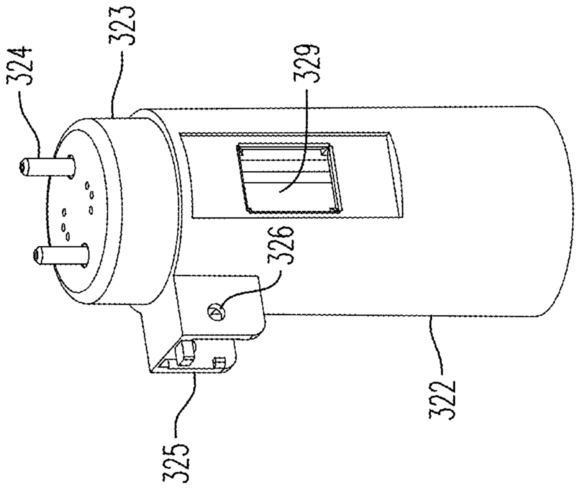
FIGS. 3A, 3B, and 3C illustrates components of a deformable lighting device pursuant to some embodiments.
Figure 3C:
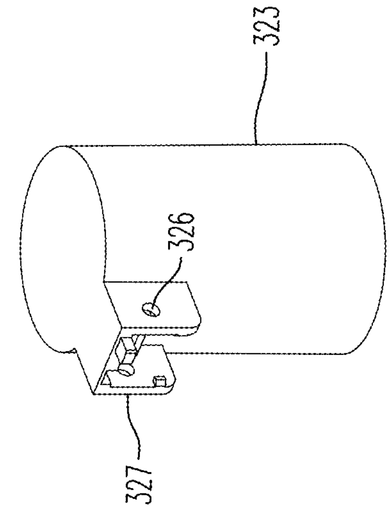
Figure 3A:
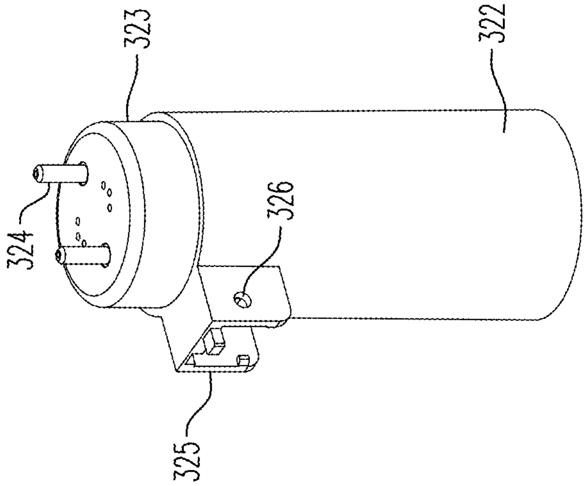

Reference is now made to FIG. 3A where further details of the pin-endcap 322 pursuant to some embodiments are shown. The pin-endcap 322 is generally cylindrical in shape (sized and shaped to fit around an end of an LED tube) and includes a cap 323 that is sized to fit in a socket such as a G13 medium bi-pin socket. The cap 323 may be formed in other styles as well and may optionally be used with a converter (not shown) to allow the lighting device to be mounted in other types of sockets. The pin-endcap 322 also is formed with, or has mounted thereon, a mount 325 that receives one end of a deformable frame (not shown in FIG. 3A but shown in FIGS. 2 and 4). As shown in the embodiment of FIG. 3A, the mount 325 has two sides each with a hole 326. Each hole 326 receives a pin (not shown in FIG. 3A but shown in FIG. 4) on an arm of the deformable frame, allowing the arm of the deformable frame to move in relation to the pin-endcap 322. As shown in FIG. 3B, pursuant to some embodiments, one of the pin-endcaps 322 may be formed to hold a switch (such as shown in FIG. 2), allowing the lighting device to be operated in a selectable fashion (e.g., such as to select a color temperature output by the lighting device).

As shown in FIG. 3C, the endcap 323 (which is mounted on an opposite end of each LED tube from the pin-endcap 322) is also formed with (or has affixed thereto) a mount 327. The mount 327 has two sides, each with a hole 326. Each hole receives a pin (not shown in FIG. 3C but shown in FIG. 4) on an arm of a deformable frame, allowing the arm of the deformable frame to move in relation to the endcap 323.

Further details of the assembly of the deformable frame pursuant to some embodiments will now be provided by reference to FIG. 4. FIG. 4A and FIG. 4B shows an arm 412 of a deformable frame. As previously shown in FIG. 2, each deformable frame 210 may include two arms 212 and a connector 229. The arm 412 has an elongated body (e.g. approximately 60-65 mm) terminating at two end tabs 450 through which pins 452 protrude. The pins 452 may protrude a short distance (e.g., approximately 0.8-1.0 mm) from a surface of the arm 412 so that they can mate with the holes 326 of the mounts 325, 327 of the pin-endcap 322 and the endcap 323 shown in FIG. 3) as well as holes 454 on the connector 429 (shown in FIG. 4C). The end tabs 450 are formed with semi-circular cuts 449 through a surface of the arm 412 allowing each end tab 450 to compress slightly, allowing the pins 452 to retract while being inserted into the mounts 325, 327 and the connector 454. The semi-circular cuts 449 may also be formed of other shapes (such as, for example, a triangular or other shape) that allow the end tabs 450 to compress slightly. The cuts 449 define a flexible tab or flap adjacent to the holes 454 which allows the surrounding material of the end tab 450 to resiliently flex and compress as the end tab 450 is positioned to mate with the pin 452. During assembly, an end tab 450 is aligned with and pressed onto a corresponding pin 452. As the end tab 450 advances over the pin 452, the pin 452 causes the flexible tab defined by the cut 449 to deflect outwardly, temporarily enlarging the effective space of the end tab 450 and permitting passage of the pin 452 toward the hole 454. Once the pin 452 is fully aligned with the hole 454 the resilient nature of the end tab 450 causes the end tab 450 to snap back to its undeformed state, capturing the pin 452 within the hole and establishing a secure, friction fit or interlocking connection. In some embodiments, the arms 412 may also be formed with a slight cut 451 or recess at the start of each end tab 450 further allowing compression of the end tab 450 for the ease of snapping or inserting the pins 452 into corresponding holes of the mounts and connector. The arms 412 may be formed of a material such as a plastic, and are, in some embodiments, formed to include a substantially hollow interior allowing wiring to pass therethrough. For example, in some embodiments, each arm 412 is approximately 62 mm long, 4-5 mm deep, and 10 mm wide. In some embodiments, the connector 429 may be approximately 15-18 mm wide and 12-13 mm deep. This allows the deformable frame to achieve the lighting device configurations described above in conjunction with FIG. 1. Those skilled in the art, upon reading this disclosure, will appreciate that other sizes may be used to achieve different configurations.

Figure 4B:
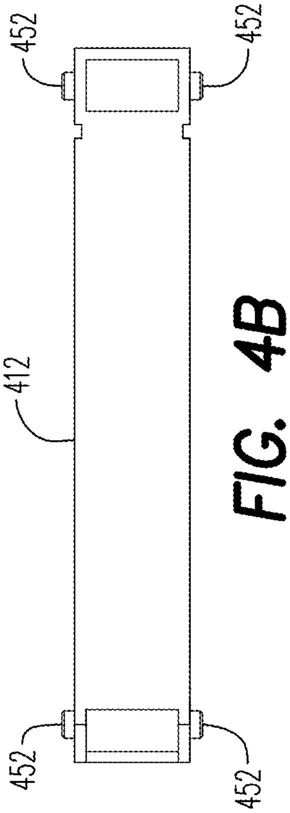
FIGS. 4A, 4B, 4C, 4D, and 4E illustrates further components of a deformable lighting device pursuant to some embodiments.
Figure 4A:
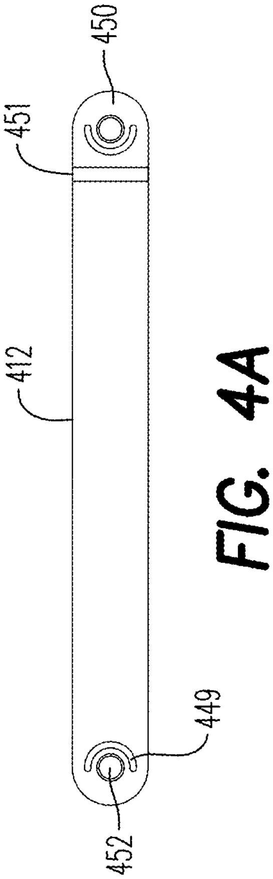
Figure 4C:
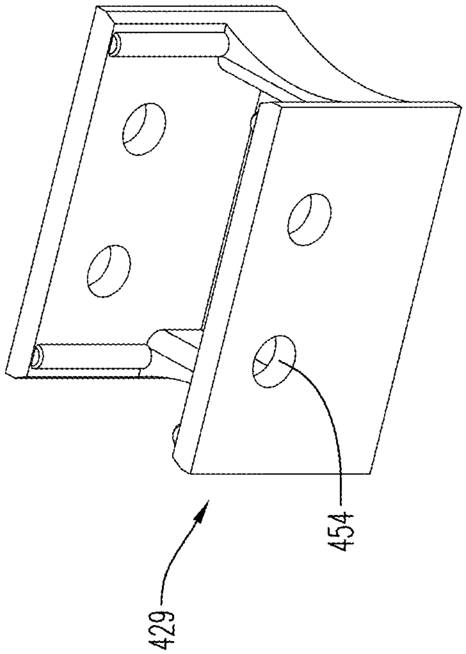
Figure 4D:
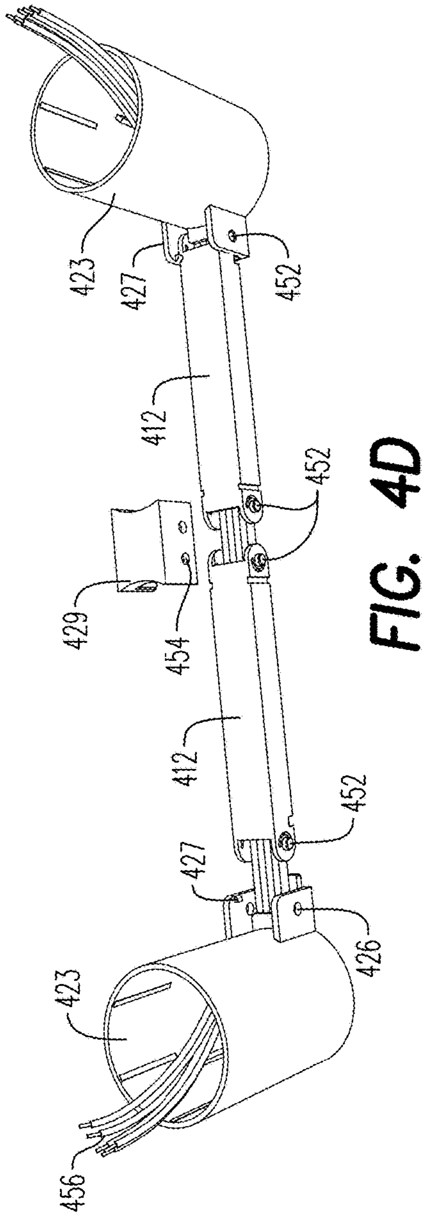

The assembly of a deformable frame is shown in FIG. 4D, where a deformable frame is shown in an exploded view (before the arms 412 have been fully snapped into or mounted in the mounts 427 of two endcaps 423). As shown in FIG. 4D, wiring 456 is run from one endcap 423 (for connection to a LED light bar 230 in a LED tube 202 as shown in FIG. 2) to the other endcap 423. The wiring 456 exits an endcap 423 at the mount 427 and is routed through each arm 412 to the other endcap 423 via the mount 427. When the arms 412 are snapped into the mounts 427 and the connector 429 is snapped onto the arms 412 (such that the pins 452 are inserted into the holes 426, 454 of the mount 427 and connector 429), the wiring 456 is essentially enclosed within the deformable frame.

Figure 4E:
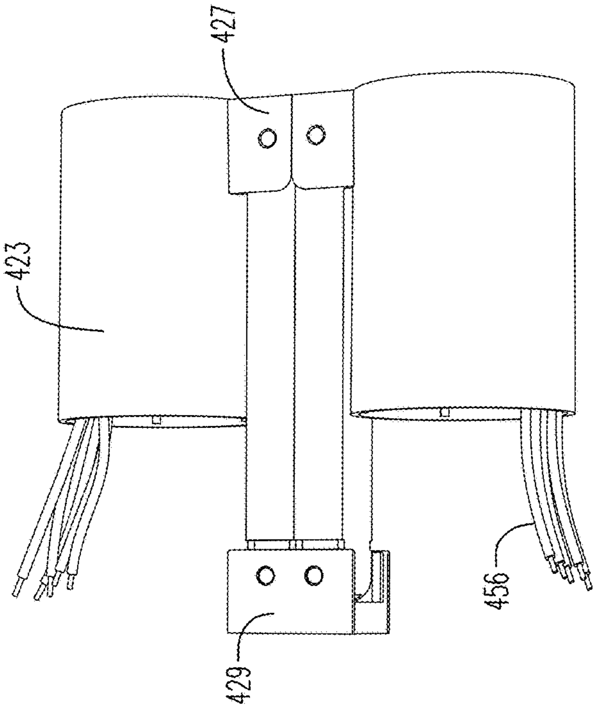

FIG. 4E shows the deformable frame in a retracted position (in the configuration shown in FIG. 1A). As shown, each arm 412 hinges or rotates with respect to each endcap 423 thanks to the rotation of each pin 452 within the holes 426, 454 of the mount 427 and connector 429. As discussed above, the length of each arm 412 is selected to allow the deformable frame to hold the elongated LED tubes in different desired configurations.

The result is an easy to assemble, highly configurable lighting device that may be used in a number of configurations and installations. Further, the device is easily compressed into a form that is more efficiently shipped or packaged.

As used herein, the term "deformable lighting device" or "lighting device" typically will refer to the combination of two or more elongated light tubes (each associated with a light bar and light sources) and deformable frames as well as associated electronics.

As used herein, the terms "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0% to 5% deviation around 0.1 and a 0% to 5% deviation around 1, especially if such deviation maintains the same effect as the listed range.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

We claim:

1. A deformable lighting apparatus, comprising:

a first and a second lighting tube positioned substantially parallel to each other, each lighting tube extending from a pin-endcap to an endcap;

a first deformable frame formed of a first leg and a second leg, the first leg extending from a hinged connection having two ends, each end hingedly connected to a first endcap mount on the first lighting tube to a first pivot joint of a first connector located in a middle portion of the first deformable frame, and the second leg extending from a hinged connection of a second endcap mount on the second lighting tube to a second pivot joint of the first connector, the first deformable frame deformable about the first connector located in a middle portion of the first deformable frame; and a second deformable frame formed of a third leg and a fourth leg, the third leg extending from a hinged connection of a pin-endcap mount of the first lighting tube to a third pivot joint of a second connector located in a middle portion of the second deformable frame, and the fourth leg extending from a hinged connection of a pin-endcap mount of the second lighting tube to a fourth pivot joint of the second connector having two ends, each end hingedly connected to the pin-endcap mounts of the first and the second lighting tubes, the second deformable frame deformable about the second connector located in a middle portion of the second deformable frame; wherein the first and second deformable frames pivot at the first and second connectors to collapse or extend the first and second lighting tubes with respect to each other and to collapse or extend the first and second leg and the third and fourth leg with respect to each other.

2. The deformable lighting apparatus of claim 1, wherein each of the first, second, third and fourth legs are substantially equal in length.

3. The deformable lighting apparatus of claim 2, wherein the first and second legs have pins extending from a surface of the first and second legs, the pins positioned to mate with corresponding holes in each of the endcap mounts and the first connector.

4. The deformable lighting apparatus of claim 3, wherein the third and fourth legs have pins extending from a surface of the third and fourth legs, the pins positioned to mate with corresponding holes in each of the pin-endcap mounts and the second connector.

5. The deformable lighting apparatus of claim 4, wherein at least one of the compressible end tabs is formed with a cut allowing the compressible end tab to expand as it is mounted on a pin.

6. The deformable lighting apparatus of claim 1, wherein the first leg and the second leg are substantially rectangular or square in cross section and sized to permit a wire to extend therethrough.

7. The deformable lighting apparatus of claim 6, wherein the wire extends from the first lighting tube to the second lighting tube and is substantially enclosed within at least one of the first leg and the second leg.

8. The deformable lighting apparatus of claim 1, wherein first and second deformable frame are deformable to place the deformable lighting apparatus in one of a first position, a second position and a third position.

9. The deformable lighting apparatus of claim 7, wherein when in the first position, the first and second lighting tubes are substantially parallel to each other and are approximately 1⅝" apart when measured from a center axis of each of the first and second lighting tubes.

10. The deformable lighting apparatus of claim 8, wherein when in the third position, the first and second lighting tubes are substantially parallel to each other and are approximately 6" apart when measured from a center axis of each of the first and second lighting tubes.

11. The deformable lighting apparatus of claim 7, wherein when in the second position, the first and second lighting tubes are substantially parallel to each other and are approximately 3" apart when measured from a center axis of each of the first and second lighting tubes.

12. The deformable lighting apparatus of claim 1, wherein the first leg and the second leg are substantially circular or oval in cross section and sized to permit a wire to extend therethrough.

13. The deformable lighting apparatus of claim 12, wherein the wire extends from the first lighting tube to the second lighting tube and is substantially enclosed within at least one of the first leg and the second leg.

14. The deformable lighting apparatus of claim 1, further comprising:

a first LED light bar disposed within the first lighting tube;

a second LED light bar disposed within the second lighting tube; and a wiring harness electrically connecting the first and the second LED light bars.

15. The deformable lighting apparatus of claim 14, wherein one of the first LED light bar and the second LED light bar is electrically connected at one end to a power source.

16. The deformable lighting apparatus of claim 14, wherein at least one of the first LED light bar and the second LED light bar is electrically connected to a driver circuit having a correlated color temperature ("CCT") selection switch to change a mode of operation of the deformable lighting apparatus.

* * * * *